Dec. 3, 1968

C. F. TONNELLINE 3,413,693

CLAMPING COLLAR

Filed April 7, 1967

Inventor:
Charles Félix Tonnelline
By
Karl W. Flocks
Attorney

Dec. 3, 1968   C. F. TONNELLINE   3,413,693
CLAMPING COLLAR

Filed April 7, 1967   2 Sheets-Sheet 2

Inventor:
Charles Félix Tonnelline
By
Karl W. Flocks
attorney

United States Patent Office 3,413,693
Patented Dec. 3, 1968

3,413,693
CLAMPING COLLAR
Charles Felix Tonnelline, 122 Ave. Francois Arago,
Nanterre, Hauts-de-Seine, France
Filed Apr. 7, 1967, Ser. No. 629,159
Claims priority, application France, Apr. 8, 1966,
57,179
7 Claims. (Cl. 24—284)

ABSTRACT OF THE DISCLOSURE

A clamping collar for cylindrical or regular polygonal bodies such as tubes, pipes, spindles and shafts, the said collar being characterized in that it comprises at least three elements having arcuate bearing surfaces coupled to each other through the intermediary of clamping means, whereby the collar forms a regular polygon circumscribed on the cross-section of the body to be gripped.

The present invention has for its object a collar, ring, or clip, serving for supporting, fixing or locking of parts, and in particular of regular cylindrical or polygonal bodies such as tubes, pipes, spindles and shafts.

There already exists a certain number of types of collars, clips or rings made either in two parts in the form of two half-rings assembled face to face, or in a single part in the form of a single stirrup.

The collar according to the invention is constituted by a circumscribable regular clamping polygon, and comprises at least three elements with an arcuate bearing surface joined to each other by clamping means.

In accordance with one form of construction, the radius of the bearing-surface arc is less than the radius of the tube to be fixed, which means that each element is in contact on the tube at two points.

According to an alternative form of construction, the radius of the bearing-surface arc is greater than the radius of the tube to be gripped, so that the contact is effected over a portion of the said arc.

Following a further form of construction, the radius of the bearing surface is equal to the radius of the tube to be supported, so that the contact arc is complete.

According to an alternative form of construction, the screw is formed by cutting-out the thinner edges of a tongue constituting an extension of each element, to the form of a screw-thread.

Following a particularly advantageous form of embodiment, the clamping polygon is an equilateral triangle.

Other characteristic features and advantages of the present invention will be brought out in the description which follows below, reference being made to the accompanying drawings, in which.

Figure 1A:
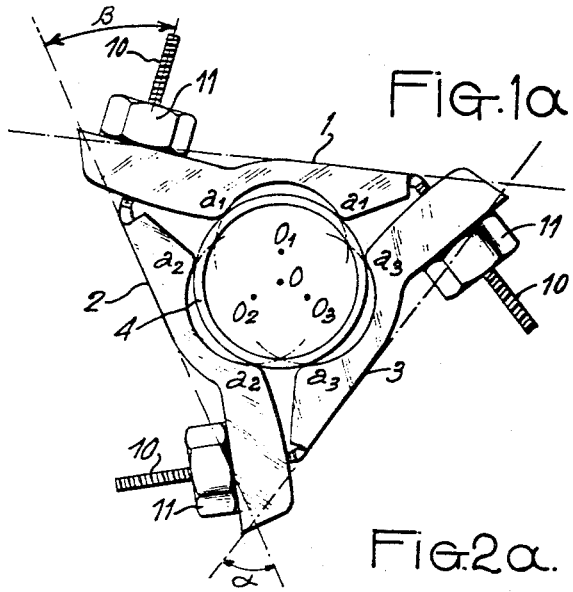
FIGS. 1a, 2a, 3a and 4a are views similar to the first four figures, and represent another form of construction of an equilateral clamping collar, each element of which comprises a screwing tongue.
Figure 2A:
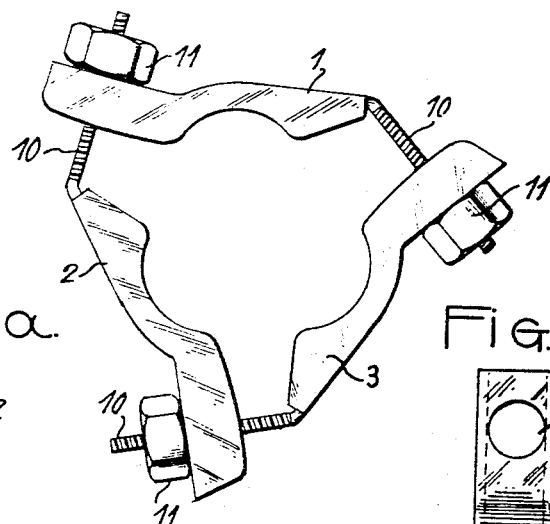
Figure 3A:
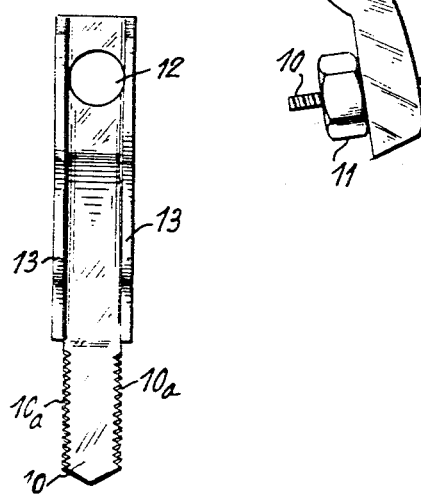
Figure 4A:
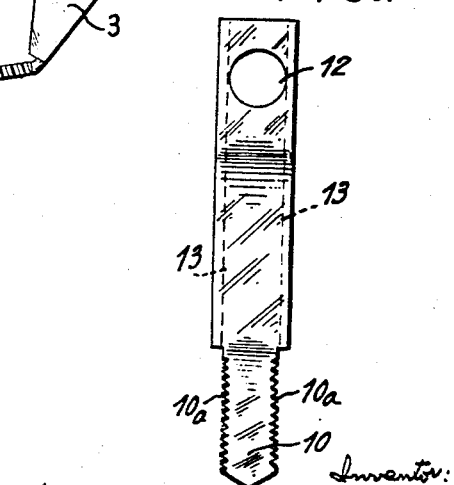
Figure 1:
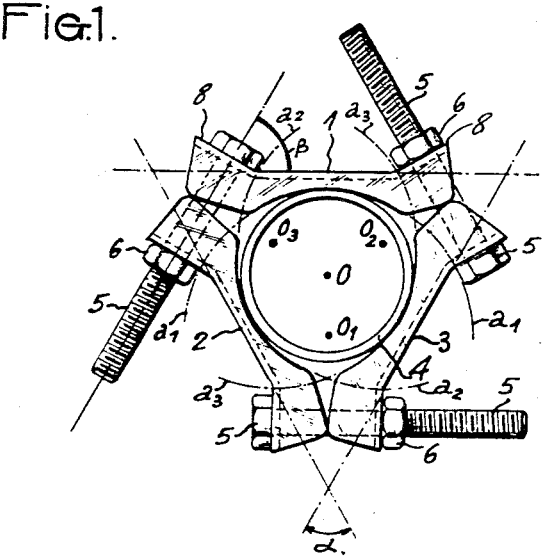
FIG. 1 is an end view of a tube gripped by an equilateral clamping collar according to the invention, with screws and nuts.
Figure 2:
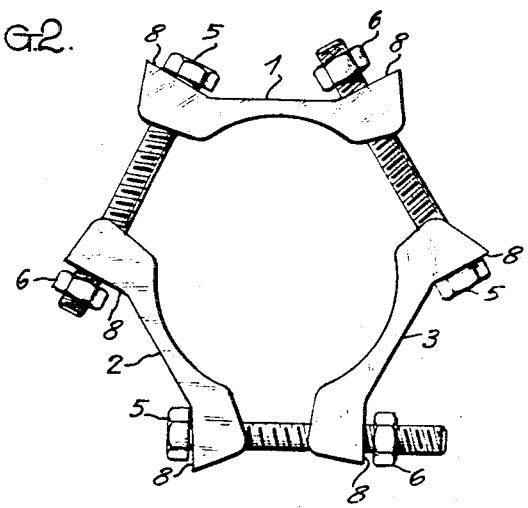
FIG. 2 shows this same clamping collar when it has been released and removed from the tube.
Figure 3:
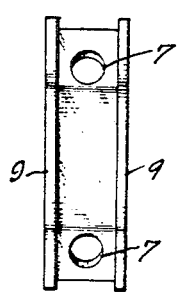
FIGS. 3 and 4 are views respectively showing the underside and the top of one of the elements of the clamping collar shown in FIGS. 1 and 2.
Figure 4:
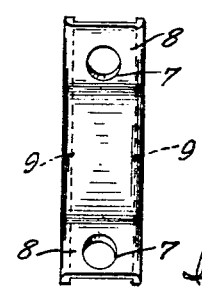

In the form of construction shown in FIGS. 1 to 4, the clamping collar according to the invention comprises three elements, 1, 2 and 3, which, when assembled together, form a circumscribable equilateral clamping triangle for a tube, a pipe, a spindle or a shaft 4.

Each element has an arcuate bearing surface, $a1$, $a2$, $a3$, having its centre at $o1$, $o2$, $o3$.

The radius of each of the bearing arcs $a1$, $a2$ and $a3$ is greater than the radius of the tube 4. The result is that the gripping contact is effected over a certain portion of the bearing surface of each element. Bearing arcs of the character just mentioned can be incorporated in the subsequently described embodiments.

The elements of the clamping triangle are joined to each other by removable screws 5 and nuts 6. Two holes 7 are pierced in each element for the passage of the screws.

The apex angles $\alpha$ of the equilateral clamping triangle are of course 60°, and each element is provided at each of its extremities with an oppositely-inclined face 8, pierced with a hole 7. By this means, the longitudinal axis of each screw forms an angle $\beta$ of 60° with the straight central portion of each element.

Each element 1, 2 or 3, is provided on its arcuate bearing surface side with two edges 9 which form the contact with the tube.

In the form of construction shown in FIGS. 1a, 2a, 3a and 4a, the clamping collar is also an equilateral triangular collar, which thus comprises three equal elements 1, 2 and 3 having arcuate bearing surfaces $a1$, $a2$ and $a3$. In actual fact, the bearing surfaces are obtained at two points of contact for each element, the radius of the arcuate bearing surface of each element being less than that of the tube, pipe, spindle or shaft 4 gripped by the circumscribable equilateral triangle. Alternatively, bearing surfaces of the character disclosed in FIG. 1, for example, can be utilized in the embodiment of FIGS. 1a–4a. Likewise, although not shown, the bearing surface may be equal in radius to that of the tube or shaft upon which the clamping means is mounted.

Each element comprises an inclined tongue 10 formed integrally with the element. The thin edges 10a of this tongue are cut-out in the form of screw threads so as to be capable of receiving a nut 11.

The circumscribable equilateral triangle formed by the collar naturally has apex angles of 60°, and therefore an inclination of an angle $\beta$ of 60°, or in the vicinity of 60°, with respect to the general plane of each element 1, 2 and 3, is given to the tongue 10.

At the extremity of the element opposite to this tongue, a hole 12 is pierced in each element in order to receive the tongue 10 of the next following element.

This extremity in which the hole 12 is provided is inclined with respect to the remainder of the element, so that its plane is perpendicular to the screwing tongue 10 which is to pass through it.

This last form of embodiment is particularly advantageous and effective, due to its two points of contact per element, it being possible to increase the clamping effect up to the point of deformation of the tube. In addition, this form of construction provides greater convenience of fixing, due to the fact that the screwing tongues are rigidly fixed to the elements.

As in the other form of embodiment, the elements are provided with raised edges 13 which produce the two-point contact.

The above description has been given generally only by way of indication and not in any limitative sense, and the invention is capable of receiving numerous alternative forms in conformity with its scope.

Thus, the clamping collar according to the invention may constitute a circumscribable regular clamping polygon having a number $n$ of sides.

I claim:
1. A clamping collar for cylindrical bodies or regular polygons such as tubes, pipes, spindles, shafts comprising at least three elements having arcuate bearing surfaces, clamping means for coupling said elements to each other, whereby the collar constitutes a regular polygon circumscribed on the straight section of the body to be gripped, each element comprising at one of its extremities an integral, threaded, angular extension forming a screw and at its other extremity a transverse hole for passage of the integral screw-forming, angular extension of another element, a nut being threadedly engaged on the integral, screw-forming angular extensions.

2. A clamping collar as claimed in claim 1, in which the radius of the arcuate bearing surface of each element is less than the radius of a body having a circular cross-section gripped by said collar, so that each element has two points of contact on said body.

3. A clamping collar as claimed in claim 1, in which the radius of the arcuate portion of each element is greater than the radius of a body having a circular cross-section gripped by the collar, so that the contact of each element on said body is effected along a portion of said arcuate bearing surface.

4. A clamping collar as claimed in claim 1, in which the radius of the arcuate bearing surface of each element is equal to the radius of a body having a circular cross-section gripped by said collar, whereby the contact of each element on said body is effected along the whole extent of said arcuate bearing surface.

5. A clamping collar as claimed in claim 1, in which the screw-forming extension of each element is constituted by a tongue, the thin edges of which are cut-out in the form of screw threads.

6. A clamping collar as claimed in claim 1, in which the screw-forming extension of each element is inclined towards the interior with respect to the general plane of the element, and the extremity of said element opposite to the extension forming the screw, is inclined towards the exterior with respect to the said plane.

7. A clamping collar as claimed in claim 1 in which each element having an arcuate bearing surface is provided, on the side of said bearing surface, with two raised edges which effect the contact with the body to be gripped.

References Cited

UNITED STATES PATENTS

| | | | |
|---|---|---|---|
| 2,230,287 | 2/1941 | Curtis | 285—373 XR |
| 2,692,745 | 10/1954 | Barrett | 248—230 XR |
| 2,908,469 | 10/1959 | Mack et al. | 248—230 |
| 2,910,261 | 10/1959 | Ward et al. | 248—230 |

DONALD A. GRIFFIN, *Primary Examiner.*